US009165700B2

(12) United States Patent
Schöps et al.

(10) Patent No.: US 9,165,700 B2
(45) Date of Patent: Oct. 20, 2015

(54) POLYPHASE-COMPRESSED-GAS-INSULATED CABLE ENTRY MODULE HAVING AN ENCAPSULATION

(75) Inventors: Jüergen Schöps, Berlin (DE); Erhard Sonnenberg, Berlin (DE)

(73) Assignee: Siemens Aktiengesellschaft, Munich (DE)

( * ) Notice: Subject to any disclaimer, the term of this patent is extended or adjusted under 35 U.S.C. 154(b) by 183 days.

(21) Appl. No.: 13/809,948

(22) PCT Filed: Jul. 11, 2011

(86) PCT No.: PCT/EP2011/061735
§ 371 (c)(1),
(2), (4) Date: Jan. 25, 2013

(87) PCT Pub. No.: WO2012/007415
PCT Pub. Date: Jan. 19, 2012

(65) Prior Publication Data
US 2013/0199816 A1   Aug. 8, 2013

(30) Foreign Application Priority Data

Jul. 14, 2010   (DE) .................. 10 2010 027 423

(51) Int. Cl.
| | |
|---|---|
| *H01B 17/36* | (2006.01) |
| *H02B 13/035* | (2006.01) |
| *H02G 15/22* | (2006.01) |
| *H02B 13/045* | (2006.01) |
| *H01R 13/53* | (2006.01) |

(52) U.S. Cl.
CPC ............ *H01B 17/36* (2013.01); *H02B 13/0358* (2013.01); *H02G 15/22* (2013.01); *H01R 13/53* (2013.01); *H02B 13/0356* (2013.01)

(58) Field of Classification Search
CPC ........ H01B 17/36; H02B 13/035; H02B 5/06; H02G 15/22; H01R 13/53
USPC .................. 174/180, 73.1, 25 G, 19, 25 R
See application file for complete search history.

(56) References Cited

U.S. PATENT DOCUMENTS 2,809,358 A * 10/1957 Whitney .................. 336/174
2,957,150 A * 10/1960 Jennings et al. ......... 336/174
(Continued)

FOREIGN PATENT DOCUMENTS

| CN | 1350353 A | 5/2002 | |
|---|---|---|---|
| DE | 2910349 | * 10/1980 | ............. H02B 13/02 |

(Continued)

*Primary Examiner* — Timothy Thompson
*Assistant Examiner* — Michael F McAllister
(74) *Attorney, Agent, or Firm* — Laurence A. Greenberg; Werner H. Stemer; Ralph E. Locher

(57) ABSTRACT

A polyphase, compressed-gas-insulated cable entry module includes an encapsulation. A plurality of phase conductors, which are electrically insulated from one another by compressed-gas insulation, are disposed in the interior of the encapsulation. The phase conductors are each electrically conductively contacted by cable connection bushes. The cable connection bushes are inserted into separate tubular connection pieces of the encapsulation. The tubular connection pieces lead into a common feeder housing of the encapsulation.

10 Claims, 1 Drawing Sheet

(56) References Cited

U.S. PATENT DOCUMENTS

| | | | | |
|---|---|---|---|---|
| 3,919,626 A | * | 11/1975 | Hermstein | 323/361 |
| 3,927,246 A | * | 12/1975 | Tahiliani et al. | 174/19 |
| 4,154,993 A | * | 5/1979 | Kumbera et al. | 200/50.24 |
| 6,811,418 B2 | * | 11/2004 | Jazowski et al. | 439/181 |
| 2002/0036185 A1 | * | 3/2002 | Luscan et al. | 218/7 |
| 2003/0066669 A1 | | 4/2003 | Gelloz et al. | |
| 2003/0228779 A1 | * | 12/2003 | Jazowski et al. | 439/181 |
| 2005/0260876 A1 | * | 11/2005 | Krause et al. | 439/181 |
| 2012/0244733 A1 | * | 9/2012 | Amidon et al. | 439/271 |

FOREIGN PATENT DOCUMENTS

| | | | |
|---|---|---|---|
| DE | 43 18 074 A1 | 12/1994 | |
| DE | EP 0627800 * | 12/1994 | ........... H02B 13/035 |
| DE | 43 37 403 A1 | 4/1995 | |
| DE | 197 20 089 A1 | 11/1998 | |
| DE | 197 20 092 A1 | 11/1998 | |
| DE | EP 0878888 * | 11/1998 | ............ H02G 14/22 |
| DE | 102 46 993 B3 | 5/2004 | |
| EP | 1406364 A1 | 4/2004 | |
| WO | 2007077188 A1 | 7/2007 | |

* cited by examiner

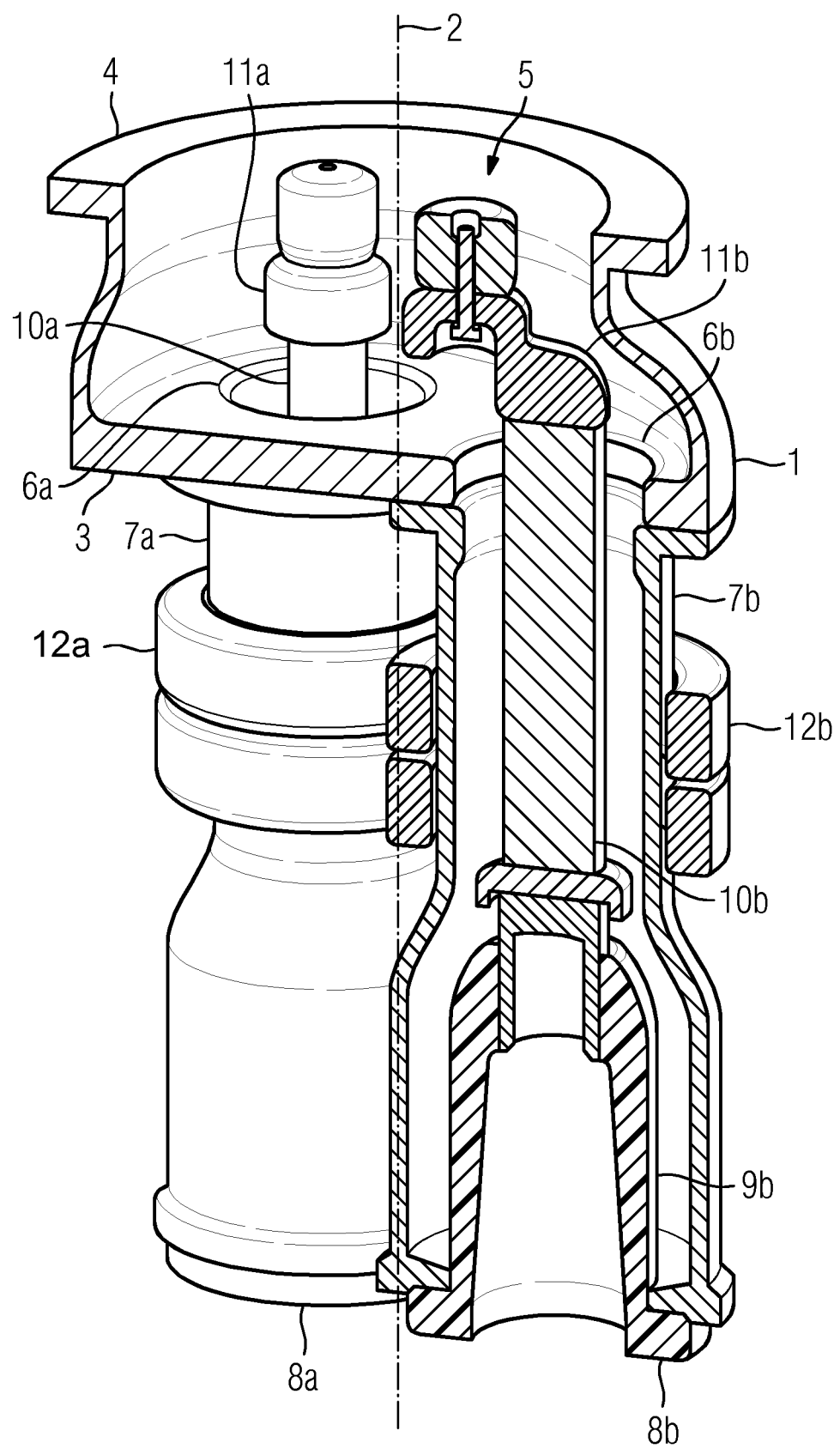

POLYPHASE-COMPRESSED-GAS-INSULATED CABLE ENTRY MODULE HAVING AN ENCAPSULATION

BACKGROUND OF THE INVENTION

Field of the Invention

The invention relates to a polyphase-compressed-gas-insulated cable entry module having an encapsulation which accommodates, in its interior, a plurality of phase conductors which are electrically insulated from one another by means of compressed-gas insulation, and having a plurality of cable connection bushes which are inserted into the encapsulation in a fluid-tight manner and are each contacted by one of the phase conductors.

A polyphase-compressed-gas-insulated cable entry module of this kind is disclosed, for example, in laid-open specification DE 197 20 092 A1. The polyphase cable entry module in said document is equipped with a high-volume housing tube which acts as an encapsulation and into which an insulating body is inserted. The insulating body serves for inserting a plurality of cables into the known cable entry module. Comparatively large interstices remain on the insulating body in the interior of the encapsulation and these interstices should be filled with an electrically insulating gas. The provision of electrically insulating gas for filling unused spaces is associated with increased costs. Furthermore, the phase conductors which are surrounded by the common housing tube are no longer accessible from the outside, and therefore it is barely possible to acquire information about the state of the respective phase conductors from the outside.

BRIEF SUMMARY OF THE INVENTION

Therefore, the object is that of specifying a cable entry module which allows improved monitoring of the individual phase conductors with a reduced volume of electrically insulating gas.

According to the invention, the object is achieved in the case of a polyphase-compressed-gas-insulated cable entry module of the type described in the introductory part in that the end of each of the cable connection bushes is inserted into in each case a separate tubular connection piece of the encapsulation, and the tubular connection pieces issue into a common feeder housing of the encapsulation.

In the embodiment of a cable connection module according to the invention, provision is made for the encapsulation to be divided into a feeder housing and a plurality of separate tubular connection pieces, so that a cable connection bush can be arranged on each tubular connection piece. The provision of separate tubular connection pieces makes it possible to reduce the volume of electrically insulating gas (insulating gas) required. Interstices between the cable connection bushes are located outside the encapsulation. These interstices do not need to be filled with the electrically insulating gas. In this case, in spite of a reduction in the volume of electrically insulating gas in the interior of the encapsulation, polyphase compressed-gas insulation is maintained since a common volume of insulating gas always flows around the phase conductors in the interior of the encapsulation. This results in advantages in respect of monitoring the insulating gas since only a single gas space in the interior of the encapsulation has to be monitored, for example in respect of pressure, moisture, partial discharge behavior etc. The encapsulation should be electrically conductive and carry ground potential. Furthermore, the encapsulation should be pressure-resistant in order to be able to withstand a positive pressure of the insulating gas.

The tubular connection pieces project from the feeder housing, it being possible for the tubular connection pieces to protrude from the encapsulation housing in different ways depending on the configuration of the encapsulation housing. In this case, provision should be made for the number of tubular connection pieces to correspond to the number of phase conductors, which are electrically insulated from one another, in the interior of the cable entry module. Therefore, it is possible, for example, to arrange in each case one phase conductor in each of the tubular connection pieces and to allow these phase conductors to project into the feeder housing through the surrounding tubular connection piece in a manner electrically insulated from the respective cable connection bush. It has proven advantageous to configure cable entry modules to be three-phase-compressed-gas-insulated, that is to say three phase conductors of an electrical energy transmission system are arranged in the interior of the cable entry module. By way of example, the electrical energy transmission system can be designed as a three-phase AC voltage system. In order to produce an arrangement which is of as compact design as possible, the phase conductors should each be arranged at the corner points of an equilateral triangle in order to ensure a sufficient degree of electrical insulation of the phase conductors from one another and from the encapsulation when they are close to one another.

Suitable insulating gases are, for example, nitrogen, sulfur hexafluoride or other electrically insulating gases. The insulating gas should be subject to an elevated pressure in the interior of the encapsulation in comparison to a medium which surrounds the encapsulation. This additionally has a positive influence on the dielectric strength of the insulating gas used.

In order to produce a dielectrically advantageous body, the feeder housing can be formed, for example, with rotational symmetry in the manner of a tube, so that projecting sharp edges are avoided as far as possible in the interior of the feeder housing. In this case, provision may be made, in addition to central combination of the phase conductors in the interior of the feeder housing, for the phase conductors to also be offset there. Therefore, it is possible, for example, proceeding from a mouth of the tubular connection pieces in the feeder housing, to make provision for the phase conductors to be offset in the radial direction in the direction of a central point. To this end, the phase conductors can be deflected in the manner of a swan-neck bend, for example, within the feeder housing. A pivoting operation of this kind is particularly advantageous when the phase conductors are arranged in the tubular connection pieces (relative to a cross section) in each case at the corner points of an equilateral triangle and there is a corresponding reduction in the distances between the phase conductors in the feeder housing, with the position in an equilateral triangle being maintained.

Division into a plurality of tubular connection pieces provides the opportunity to be able to separately monitor a phase conductor which runs within an individual tubular connection piece. In particular, electric/magnetic fields of individual phase conductors can be detected independently of interaction with other phase conductors in the region of the tubular connection pieces.

A further advantageous refinement can make provision for the cable connection bushes to each project in a pocket-like manner into the respective tubular connection pieces.

Polyphase compressed-gas-insulated cable entry modules can be used, for example, in compressed-gas-insulated switchgear assemblies. Switchgear assemblies of this kind are used in order to change a configuration in electrical energy transmission networks by establishing or breaking electrically conductive connections between individual network sections. Within the compressed-gas-insulated switchgear assembly, the relevant phase conductors are electrically insulated from one another by means of a superpressurized gas. Corresponding supporting insulators are provided in order to position and support the phase conductors in the interior of the switchgear assembly.

Arrangements which are compact in comparison to alternative insulation means are formed by means of compressed-gas insulation. However, on account of the demands placed on the encapsulation in respect of positive-pressure resistance, compressed-gas insulation of this kind is comparatively costly. Cables, for example, are used to connect individual switchgear assemblies within an electrical energy transmission network. Cables take the potential of the phase conductors of the compressed-gas-insulated switchgear assembly and carry this potential to other switchgear assemblies or energy consumers with solid insulation. In order to be able to merge cable insulation and compressed-gas insulation, cable connection bushes are formed in the encapsulation, for example. The cable connection bushes act as an interface between the compressed-gas insulation of the cable entry module and the insulation of a cable. In this case, the cable connection bushes project in a pocket-like manner into the tubular connection pieces. The cable connection bushes have, firstly, an electrically conductive current path in order to establish an electrically conductive contact-connection between the phase conductors of the cable entry module and the phase conductors of the cables which are to be connected. The electrically conductive current path passes through the cable connection bush in a fluid-tight manner. In order to be held in an electrically insulated manner, the cable connection bushes are provided with electrically insulating guide sleeves. Therefore, provision may be made, for example, for the cable connection bush to have a substantially conically tapering guide sleeve which is flange-connected to a tubular connection piece and accordingly projects into the tubular connection piece. In this case, the tubular connection piece forms both a mechanical holder for the cable connection bush and a mechanical cover for the cable connection bush in the radial direction, and therefore the cable connection bush is protected by the tubular connection piece against external influences. The cable connection bush can have, for example, a peripheral shoulder which is connected to the tubular connection piece in a fluid-tight manner at a flange face which is arranged at the end. Therefore, the encapsulation can be closed in a fluid-tight manner by means of the cable connection bush. A so-called cable plug, which has a diametrically opposed shape in relation to the guide sleeve and the electrically conductive current path of the cable connection bush, can be inserted into the cable connection bush. The cable plug can be used to dielectrically terminate an end of a cable, so that electrical contact is made between the cable entry module and a cable by simply inserting the cable plug into the cable connection bush.

Provision may advantageously be made for the tubular connection pieces to be oriented approximately parallel to one another.

An approximately parallel orientation of the tubular connection pieces relative to one another makes it possible for the tubular connection pieces themselves to move close to one another and to avoid spaces between the tubular connection pieces as far as possible. As a result, a compact cable entry module can be provided.

A further advantageous refinement can make provision for the cross section of the tubular connection pieces at a cable-connection-bush-side end to be greater than at a mouth-side end.

If a larger cross section is provided at the cable-connection-side end, it is possible to insert various types of cable connection bushes, which have different radial dimensions, into the tubular connection pieces. The shape and configuration of the cable connection bush required for the connection can vary depending on the type of cable used, for example a plastic cable, a ground cable etc. Radial expansion of the cross section of the tubular connection piece at the cable-connection-bush-side end provides a reserve installation space in order to be able to accommodate various structures, for example from various cable connection bush manufacturers.

By way of example, provision may be made for the tubular connection piece to be formed in the manner of a bottle with a bottleneck-like mouth-side end of reduced cross section.

A further advantageous refinement can make provision for each tubular connection piece to be surrounded at the mouth-side end by a current transformer.

On account of the increase in cross section at the cable-connection-bush-side end, the various tubular connection pieces can move closer to one another only to a limited extent, specifically until the tubular connection pieces come into direct contact with one another. The region of the tubular connection piece of reduced cross section which is located at the mouth-side end provides a sufficient amount of installation space to arrange a current transformer on the tubular connection piece in each case. The flow of current through a phase conductor which runs in the interior of the respective tubular connection piece can be measured by means of a current transformer. As a result, firstly the volume which is surrounded in the interior of the cable entry module can be reduced and secondly each individual phase conductor can be individually monitored in respect of a current throughflow rate. Therefore, the installation space in the cable entry module is utilized in an advantageous manner.

A further advantageous refinement can make provision for the tubular connection pieces to issue into a first side of the feeder housing and for each of the phase conductors to enter the feeder housing through a separate mouth opening and for the phase conductors to pass through a common flange opening in the feeder housing on a second side which is averted from the first side.

On account of the phase conductors individually passing from the tubular connection piece, through separate mouth openings, into the feeder housing, a sufficient amount of space is provided around the mouth opening in each case to attach the tubular connection pieces to the feeder housing. The use of a common flange opening creates, by means of the feeder housing, the option of providing a transition of the phase conductors to conventional polyphase compressed-gas insulation. In this case, conventional polyphase compressed-gas insulation is determined by a tubular encapsulation housing in which the phase conductors are arranged together, that is to say the phase conductors are surrounded by a common housing in the case of conventional polyphase compressed-gas insulation. In this respect, the division of the encapsulation at the feeder housing into different tubular connection pieces constitutes a departure from the previous concept. Each of the phase conductors is separately encased by the encapsulation in the respective separate tubular connection piece, with the insulating gas which is located in the interior of the tubular connection piece, as a joint volume of all the phase conductors, providing electrical insulation.

Furthermore, provision may advantageously be made for the tubular connection pieces to each be formed substantially coaxially to a tube axis and for the tube axes to be oriented axially parallel.

Forming the tubular connection pieces coaxially to a tube axis allows the formation of a dielectrically advantageous tubular connection piece in which projections or the like in the interior are avoided. Therefore, a phase conductor can be positioned coaxially to the tube axis within the tubular connection piece, the casing of said phase conductor being surrounded by a cushion of insulating gas. Therefore, it is possible to manufacture the tubular connection pieces, for example, from a metal material. The tubular connection pieces can be manufactured, for example, from aluminum, with the aluminum being made into the shape of a tubular connection piece by means of a casting process. The feeder housing can likewise be a metal body which has likewise been subjected to shaping by means of a casting process. An axially parallel arrangement of the tubular connection pieces further allows said tubular connection pieces to be arranged with their longitudinal axes at the corner points of an equilateral triangle, so that as little intermediate space as possible remains between the rotationally symmetrical tubular connection pieces.

A further advantageous refinement can make provision for the common flange opening to be situated perpendicular to the tube axes.

A perpendicular orientation of the common flange opening allows the phase conductors to run independently of a division of the encapsulation into a feeder housing and into the tubular connection pieces, to allow the phase conductors to run in a main direction. Irrespective of the shaping of the encapsulation, the phase conductors can run substantially along its longitudinal extent. The common flange opening can be surrounded, for example, by a leaf flange, so that the flange opening can be connected to a further encapsulation housing. Therefore, it is possible, for example, to connect the cable entry module to a further assembly of a compressed-gas-insulated switchgear assembly.

A further advantageous refinement can make provision for the common flange opening to be closed in a fluid-tight manner by an insulating body through which the phase conductors pass.

Closing the flange opening allows the volume of the cable entry module to be limited to the extent of the tubular connection pieces and the feeder housing, and thus the insulating gas which is to be monitored to be closed off in the interior of the cable entry module. It is possible, for example, to use the insulating body to premount the cable entry module and to fill said cable entry module with an insulating gas and, for example, to mount said cable entry module on a further encapsulation housing by means of a flange which surrounds the flange opening. The insulating body can be designed, for example, in the form of a disk and can have a mechanically stabilizing, and possibly electrically conductive, frame.

A further advantageous refinement can make provision for the tubular connection pieces to each be connected to the feeder housing by means of a flange connection.

A connection between the feeder housing and the tubular connection piece by means of a flange connection permits the cable entry module to be equipped with various tubular connection pieces and/or alternative feeder housings. Therefore, the cable entry module can, if required, be composed of various modules for the feeder housing and the tubular connection pieces, so that various types of cable entry module can be formed, for example depending on the voltage level or depending on the cable connection bush used. In this case, it is particularly advantageous for the flange connection to be, for example, a leaf flange which can be screwed-connected, so that a connection between the tubular connection piece and the feeder housing can be repeatedly broken and established. This is particularly advantageous when current transformers are arranged on the tubular connection pieces. By releasing a flange connection between the tubular connection piece and the feeder housing, it is possible, for example, to remove a defective current transformer from the tubular connection piece and replace it with an intact device. In this case, provision may be made, for example, for the flange connection to be designed in the manner of a loose flange, that is to say a ring flange, which has a flange face, can be removed from the tubular connection piece. As a result, the cross section of the current transformer that is required for mounting an annular current transformer on the tubular connection piece can be reduced since, for example, the ring flange is connected to the tubular connection piece at a rigid angle only after the current transformer has first been mounted on said tubular connection piece.

BRIEF DESCRIPTION OF THE SEVERAL VIEWS OF THE DRAWING

An exemplary embodiment of the invention will be described in greater detail in the following text, and is illustrated schematically in a drawing below, in which:
the FIGURE shows a section through a cable entry module.

DESCRIPTION OF THE INVENTION

The polyphase-compressed-gas-insulated cable entry module shown in section in the figure has a feeder housing 1. The feeder housing 1 is formed in a substantially rotationally symmetrical manner and is oriented coaxially to a longitudinal axis 2. On a first side 3, the feeder housing 1 is provided with a flat wall which has a circular periphery. The flat wall of the first side 3 is oriented perpendicular to the longitudinal axis 2. A common flange opening 5 is located on a second side 4 which is averted from the first side 3. The common flange opening 5 has a circular contour, with the common flange opening 5 being bounded at its outer periphery by a flange ring, so that the common flange opening 5 and the flange ring are at a level which is oriented perpendicular to the longitudinal axis 2. Therefore, the first side 3 and the second side 4 are each oriented parallel to one another and the longitudinal axis 2 passes through them in a perpendicular fashion. The two sides 3, 4 are connected to one another via a housing casing of the feeder housing 1, so that an accommodation space is formed in the interior of the feeder housing 1. The housing casing is configured in such a way that the cross section of the accommodation space is reduced to the cross section of the common flange opening 5 from the first side 3.

The feeder housing 1 is illustrated in section in the FIGURE. Three separate mouth openings 6a, 6b are located in the wall of the first side 3, only one mouth opening 6a of said three mouth openings being completely visible and a further mouth opening 6b being shown in section because of the way in which the sectional cut is made. The arrangement of the mouth openings in the wall of the first side 3 is provided such that these mouth openings each mark corner points of an equilateral triangle, so that the mouth openings 6a, 6b are arranged in a manner distributed symmetrically over the circular area of the wall of the first side 3.

Tubular connection pieces 7a, 7b are flange-connected to the mouth openings 6a, 6b. Once again, one tubular connection piece 7a is accordingly shown in perspective view, while a further tubular connection piece 7b is shown in section. All the tubular connection pieces 7a, 7b and all the phase conductors 10a, 10b are in each case formed in an identical manner. The third tubular connection piece which belongs to the three-phase-insulated system is not shown on account of the position of the sectional plane of the FIGURE. The tubular connection pieces 7a, 7b are in each case formed in an identical manner. The tubular connection pieces 7a, 7b are flanged-connected to the first side 3 of the feeder housing 1 in a fluid-tight manner, so that the mouth openings 6a, 6b are each surrounded by a mouth-side end of the tubular connection pieces 7a, 7b. The tubular connection pieces 7a, 7b are formed substantially coaxially to the tubular connection piece axes, with the tubular connection piece axes being oriented parallel to one another and also parallel to the longitudinal axis 2. The tubular connection pieces 7a, 7b have an enlarged cross section at the cable-connection-bush-side end, which is averted from the mouth-side end. Cable connection bushes 8a, 8b are in each case made in the tubular connection pieces 7a, 7b at the cable-connection-bush-side end of enlarged cross section of said tubular connection pieces. In this case, the cable connection bushes 8a, 8b close the tubular connection pieces 7a, 7b in each case at the ends in a fluid-tight manner and project in a pocket-like manner into the respective tubular connection pieces 7a, 7b by way of a conical guide sleeve 9b. An electrically conductive current path passes in a fluid-tight manner through the guide sleeves 9b at the base-side end thereof. Cable plugs, which are formed in a correspondingly diametrically opposed manner, for establishing electrical contact between the cable entry module and cables can be inserted into the cable connection bushes 8a, 8b.

A plurality of phase conductors 10a, 10b are arranged in the interior of the cable entry module. One of the phase conductors 10a, 10b is in each case arranged coaxially in the interior of a tubular connection piece 7a, 7b. The phase conductors 10a, 10b which are located coaxially in the interior of the tubular connection pieces 7a, 7b are firstly contacted by the electrically conductive current paths of the cable connection bushes 8a, 8b, and secondly the phase conductors 10a, 10b project through the mouth openings 6a, 6b into the interior of the feeder housing 1. Provision is made for the phase conductors 10a, 10b to pivot in the interior of the feeder housing 1 by means of swan-neck bends 11a, 11b, so that the phase conductors 10a, 10b are also guided in a manner located in a triangular arrangement, but coming closer to one another on account of the reduced cross section of the common flange opening 5. The common flange opening 5 can be closed in a fluid-tight manner, so as to guide the phase conductors 10a, 10b through in a fluid-tight manner, by means of an insulating body (not shown in the FIGURE). The insulating body can be, for example, a disk-type insulator which bears in a fluid-tight manner against the flange face which surrounds the common flange opening 5.

The interior of the feeder housing 1 is filled with a highly pressurized electrically insulating gas, for example sulfur hexafluoride gas. The tubular connection pieces 7a, 7b are also connected to the interior of the feeder housing 1 via mouth openings 6a, 6b, so that the insulating gas also extends into the tubular connection pieces 7a, 7b. The gas is prevented from escaping via the tubular connection pieces 7a, 7b on account of the tubular connection pieces 7a, 7b being closed off in a fluid-tight manner by means of the cable connection bushes 8a, 8b. Given a corresponding arrangement of an insulating body over the common flange opening 5, the insulating gas cannot escape there either. This creates an encapsulation which, in its interior, accommodates a gas which flows around all the phase conductors 10a, 10b in the interior of the cable entry module with the same insulating gas volume.

In order to detect a flow of current into the phase conductors 10a, 10b, annular current transformers 12a, 12b are fitted at the mouth-side end of the tubular connection pieces 7a, 7b which have a cross section which is reduced in relation to the cable-connection-bush-side end. At present, each tubular connection piece 7a, 7b has an associated current transformer 12a, 12b with two cores which have corresponding secondary windings. The secondary windings surround the tubular connection pieces 7a, 7b and are supported on them. On account of the configuration with two cores, it is possible, for example, to use a measurement core to measure a flow of current within the phase conductors 10a, 10b for measurements in the rated current range, and it is possible to measure currents in the overcurrent range, which currents flow in the phase conductors 10a, 10b, using a second core, a so-called protective core. The phase conductors 10a, 10b pass through the secondary windings of the respective current transformer 12a, 12b and serve as a primary winding. It goes without saying that the design of the current transformers and the used measurement principles can vary, in particular the number of cores used can vary.

The invention claimed is:

1. A polyphase, compressed-gas-insulated cable entry module, comprising:
   an encapsulation having an interior, a feeder housing and tubular connection pieces leading in common into said feeder housing;
   a plurality of phase conductors accommodated in said interior of said encapsulation and electrically insulated from one another by compressed-gas insulation; and
   a plurality of cable connection bushes inserted into said encapsulation in a fluid-tight manner and each contacted by a respective one of said phase conductors, said cable connection bushes having ends each being inserted into a respective separate one of said tubular connection pieces.

2. The polyphase, compressed-gas-insulated cable entry module according to claim 1, wherein said cable connection bushes each project in a pocket-like manner into said respective one of said tubular connection pieces.

3. The polyphase, compressed-gas-insulated cable entry module according to claim 1, wherein said tubular connection pieces are oriented approximately parallel to one another.

4. The polyphase, compressed-gas-insulated cable entry module according to claim 1, wherein said tubular connection pieces have a cable-connection-bush-side end and a mouth-side end with cross sections, and said cross section at said cable-connection-bush-side end is greater than said cross section at said mouth-side end.

5. The polyphase, compressed-gas-insulated cable entry module according to claim 4, which further comprises current transformers each surrounding a respective one of said tubular connection pieces at said mouth-side end.

6. The polyphase, compressed-gas-insulated cable entry module according to claim 1, wherein:
   said feeder housing has first and second sides facing away from each other, a common flange opening in said second side, and separate mouth openings;
   said tubular connection pieces lead into said first side of said feeder housing;
   each of said phase conductors enters said feeder housing through a separate one of said respective mouth openings; and said phase conductors pass through said common flange opening.

7. The polyphase, compressed-gas-insulated cable entry module according to claim 1, wherein said tubular connection pieces have respective axially parallel oriented tube axes, and said tubular connection pieces are each formed substantially coaxially to a respective one of said tube axes.

8. The polyphase, compressed-gas-insulated cable entry module according to claim 6, wherein:
   said tubular connection pieces have respective axially parallel oriented tube axes;
   said tubular connection pieces are each formed substantially coaxially to a respective one of said tube axes; and
   said flange opening is perpendicular to said tube axes.

9. The polyphase, compressed-gas-insulated cable entry module according to claim 6, which further comprises an insulating body through which said phase conductors pass, said flange opening being closed in a fluid-tight manner by said insulating body.

10. The polyphase, compressed-gas-insulated cable entry module according to claim 1, wherein said tubular connection pieces are each connected to said feeder housing by a respective flange connection.

\* \* \* \* \*